US011507104B2

(12) United States Patent
Kamada

(10) Patent No.: US 11,507,104 B2
(45) Date of Patent: Nov. 22, 2022

(54) OBSTACLE SENSOR SYSTEM AND AUTONOMOUS DEVICE USING THE SAME

(71) Applicant: SharkNinja Operating, LLC, Needham, MA (US)

(72) Inventor: Isaku D. Kamada, Brighton, MA (US)

(73) Assignee: SharkNinja Operating LLC, Needham, MA (US)

( * ) Notice: Subject to any disclaimer, the term of this patent is extended or adjusted under 35 U.S.C. 154(b) by 260 days.

(21) Appl. No.: 16/881,559

(22) Filed: May 22, 2020

(65) Prior Publication Data
US 2020/0371526 A1 Nov. 26, 2020

Related U.S. Application Data

(60) Provisional application No. 62/852,444, filed on May 24, 2019.

(51) Int. Cl.
*B25J 11/00* (2006.01)
*G05D 1/02* (2020.01)
*B25J 19/02* (2006.01)

(52) U.S. Cl.
CPC ........ *G05D 1/0238* (2013.01); *B25J 11/0085* (2013.01); *B25J 19/021* (2013.01); *G05D 2201/0215* (2013.01)

(58) Field of Classification Search
CPC .. B25J 19/021; B25J 11/0085; A47L 11/4061; A47L 9/0009; A47L 11/4011; A47L 9/2805; A47L 9/2852; A47L 2201/04; G01S 17/931; G01S 17/04; G05D 1/0238; G05D 2201/0215
See application file for complete search history.

(56) References Cited

U.S. PATENT DOCUMENTS

| 7,171,285 B2 * | 1/2007 | Kim ......................... G06T 7/20 73/1.22 |
| 7,389,156 B2 * | 6/2008 | Ziegler ................. A47L 7/0009 701/25 |
| 7,397,213 B2 | 7/2008 | Im et al. |

(Continued)

FOREIGN PATENT DOCUMENTS

| CN | 108656150 A | 10/2018 |
| EP | 2236069 A2 | 10/2010 |

(Continued)

OTHER PUBLICATIONS

Costea et al., Design and implementof independent position confirming and correcting system, 2018, IEEE, p. 1-5 (Year: 2018).*

(Continued)

*Primary Examiner* — McDieunel Marc
(74) *Attorney, Agent, or Firm* — Grossman Tucker Perreault & Pfleger, PLLC

(57) ABSTRACT

A robotic cleaner may include a body, an optical receiver, the optical receiver being configured to detect an optical signal generated by an external device, and an optical pattern generator configured to emit light according to an optical pattern that extends at least partially around the body, wherein, when the optical pattern intersects an obstacle, at least a portion of the light incident on the obstacle is reflected towards the optical receiver, the optical receiver being configured to detect the reflected light.

18 Claims, 4 Drawing Sheets

(56) References Cited

U.S. PATENT DOCUMENTS

| | | | |
|---|---|---|---|
| 7,620,476 B2* | 11/2009 | Morse | A47L 11/4088 |
| | | | 901/1 |
| 9,020,641 B2 | 4/2015 | Jeong et al. | |
| 9,239,389 B2 | 1/2016 | Jeong et al. | |
| 2009/0084935 A1* | 4/2009 | Rollins | G02B 26/10 |
| | | | 250/206 |
| 2014/0036062 A1 | 2/2014 | Yoon et al. | |
| 2016/0188985 A1 | 6/2016 | Kim et al. | |
| 2017/0001311 A1 | 1/2017 | Bushman et al. | |
| 2017/0220043 A1 | 8/2017 | Chiappetta | |
| 2018/0177371 A1 | 6/2018 | Kim et al. | |

FOREIGN PATENT DOCUMENTS

| | | |
|---|---|---|
| KR | 101840628 B1 | 3/2018 |
| KR | 101918684 B1 | 2/2019 |

OTHER PUBLICATIONS

Sergiyenko et al., Precise optical scanning for practical multi-applications, 2009, IEEE, p. 1656-1661 (Year: 2009).*
Xu et al., The Near-field Radiation Pattern of an OLED Panel and Its Application in Detection, 2018, IEEE, p. 1-6 (Year: 2018).*
Lee et al., Design and Implementation of a Distributed Optical Proximity Sensor System, 1992, IEEE, p. 359-366 (Year: 1992).*
PCT Search Report and Written Opinion dated Aug. 14, 2020, received in PCT Application No. PCT/US20/34262, 10 pgs.

* cited by examiner

OBSTACLE SENSOR SYSTEM AND AUTONOMOUS DEVICE USING THE SAME

CROSS-REFERENCE TO RELATED APPLICATIONS

The present application claims the benefit of U.S. Provisional Application Ser. No. 62/852,444 filed on May 24, 2019, entitled Obstacle Sensor and Autonomous Device using the same, which is fully incorporated herein by reference.

TECHNICAL FIELD

The present disclosure is generally related to sensor systems for an autonomous device and more specifically related to an obstacle sensor system.

BACKGROUND INFORMATION

Autonomous devices, such as robotic cleaners (e.g., a robotic vacuum cleaner), have a control system configured to cause the autonomous device to engage in certain behaviors. The control system may be communicatively coupled to one or more sensors configured to detect one or more conditions of a surrounding environment. For example, the one or more sensors may include an obstacle detection sensor configured to detect an obstacle in the environment. Upon detection of the obstacle, the control system may cause the autonomous device to engage in an evasive behavior such that the obstacle is avoided.

BRIEF DESCRIPTION OF THE DRAWINGS

These and other features and advantages will be better understood by reading the following detailed description, taken together with the drawings, wherein.

DETAILED DESCRIPTION

The present disclosure is generally directed to a robotic cleaner. The robotic cleaner includes an optical pattern generator configured to emit light into a surrounding environment according to an optical pattern and an optical receiver configured to detect light. Light defining the optical pattern is incident on obstacles within the surrounding environment. At least a portion of the incident light is reflected back towards the robotic cleaner such that the reflected light is incident on the optical receiver. A behavior of the robotic cleaner (e.g., a movement direction) may be altered in response to the reflected light being detected by the optical receiver such that the robotic cleaner may, for example, avoid contacting the obstacle. The optical receiver is further configured to detect an optical signal emitted into the surrounding environment by an external device (e.g., a docking station or a beacon). Upon detecting the optical signal, the robotic cleaner may be caused to engage in a behavior associated with the optical signal (e.g., move towards or away from the external device). As such, the robotic cleaner is configured to differentiate between the reflected light of the optical pattern and the light defining the optical signal. Use of the optical receiver to detect obstacles and to detect optical signals from the external device may decrease the size of the robotic cleaner and/or reduce the cost of building the robotic cleaner.

Forward portion, as generally used herein, may refer to a surface or surfaces of a robotic cleaner that face the direction of forward movement of the robotic cleaner. For example, for a circular robotic cleaner, the forward portion may correspond to the forward half of the robotic cleaner. Surfaces parallel to the direction of movement may not be included in the forward portion. For example, for a robotic cleaner having one or more planar sides that extend parallel to the direction of movement, the planar sides may not form part of the forward portion of the robotic cleaner.

Figure 1:
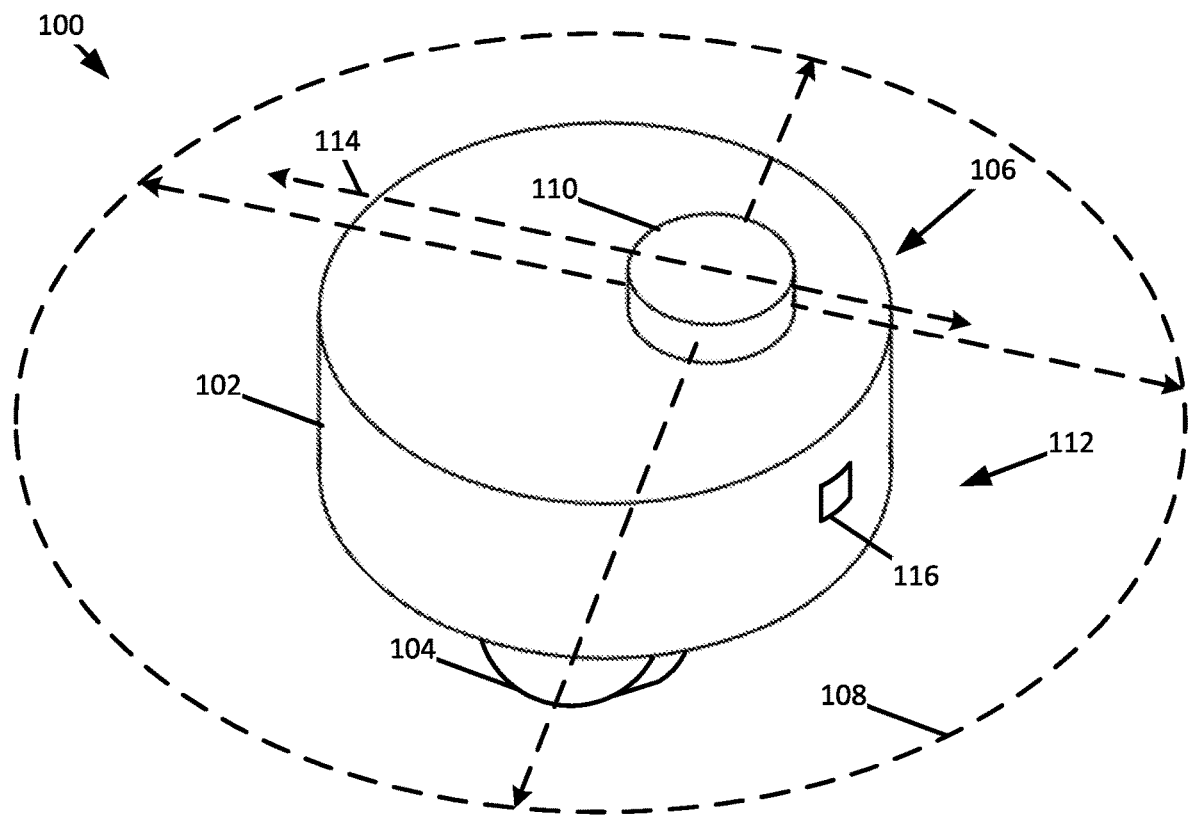
FIG. 1 is a schematic perspective view of an example of a robotic cleaner, consistent with embodiments of the present disclosure.

FIG. 1 is a schematic example of a robotic cleaner 100. The robotic cleaner 100 includes a body 102, one or more drive wheels 104 configured to urge the robotic cleaner 100 across a surface to be cleaned, and an obstacle detection system 106. The robotic cleaner 100 may also include a suction motor configured to suction debris from a surface to be cleaned into a dust cup of the robotic cleaner 100, one or more agitators (e.g., brush rolls) configured to engage (e.g., contact) the surface to be cleaned, and/or any other cleaning component.

As shown, the obstacle detection system 106 may include an optical pattern generator 110 that is configured to emit light according to an optical pattern 108 that extends at least partially around the body 102 of the robotic cleaner 100. In other words, the optical pattern generator 110 may generally be described as being configured to generate the optical pattern 108, wherein the optical pattern 108 is defined by the light emitted from the optical pattern generator 110. For example, the optical pattern 108 may extend entirely around the body 102 of the robotic cleaner 100. By way of further example, the optical pattern 108 may extend at least around a forward portion 112 of the body 102 of the robotic cleaner 100. The optical pattern 108 may have any shape (e.g., an arcuate shape, a circular shape, a line shape, a square shape, a triangular shape, and/or any other shape).

The optical pattern generator 110 can be disposed on a central axis 114 of the body 102 of the robotic cleaner 100. The central axis 114 can extend parallel to a movement direction of the robotic cleaner 100. In some instances, the optical pattern generator 110 may be centrally disposed on the body 102 of the robotic cleaner 100. Such a configuration may allow for an intensity of the emitted optical pattern 108 to be substantially constant as it extends around the body 102 of the robotic cleaner 100. In some instances, the optical pattern generator 110 may be positioned at a location forward of the center of the body 102 of the robotic cleaner 100. For example, the optical pattern generator 110 may be disposed proximate a forward most location on the robotic cleaner 100 (e.g., on a displaceable bumper configured to be displaced in response to contact with an obstacle). In some instances, the optical pattern generator 110 may be centrally aligned along the central axis 114 such that a central portion of the optical pattern generator 110 is spaced apart from a central portion of the body 102.

When the light defining the optical pattern 108 intersects an obstacle, a portion of the light incident on the obstacle is reflected towards the robotic cleaner 100 such that the obstacle detection system 106 detects the presence of the obstacle. For example, the obstacle detection system 106 may include one or more optical receivers 116 configured to detect at least a portion of the reflected light. Based, at least in part, on the detection of the reflected light, the robotic cleaner 100 can be caused to change a movement behavior such that, for example, contact with the obstacle is avoided.

Figure 2:
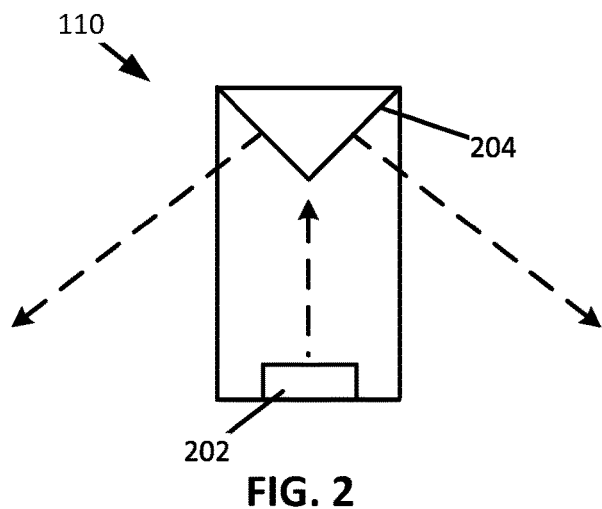
FIG. 2 is a schematic cross-sectional view of an optical pattern generator, consistent with embodiments of the present disclosure.

As shown in FIG. 2, the optical pattern generator 110 includes an optical emitter 202 and an optical disperser 204. The optical emitter 202 is optically coupled to the optical disperser 204 such that light emitted from the optical emitter 202 is incident on the optical disperser 204 and dispersed by the optical disperser 204 into a surrounding environment. The optical disperser 204 can be configured such that the size and shape of the optical pattern 108 corresponds to a desired obstacle detection region that extends at least partially around the body 102 of the robotic cleaner 100.

The optical emitter 202 can be, for example, a light emitting diode (LED) configured to emit light in one or more of the infrared (IR) spectrum, visible spectrum, ultraviolet spectrum, and/or any other spectrum of light. The optical disperser 204 can be a mirror configured to reflect light incident thereon. For example, and as shown, the optical disperser 204 can be a conical mirror, wherein the conical mirror extends in a direction of the optical emitter 202.

In some instances, the optical disperser 204 can be configured to shape the light incident thereon. For example, the optical disperser 204 can include one or more patterns etched thereon such that the incident light dispersed therefrom takes a shape that corresponds to the pattern. By way of further example, the optical disperser 204 can be configured to disperse light such that the optical pattern 108 extends around substantially only the forward portion 112 of the body 102 of the robotic cleaner 100. For example, in instances where the optical disperser 204 includes a mirror, the mirror may be configured to be at least partially conical (e.g., the mirror may have a half-cone shape) such that the optical pattern 108 extends around substantially only the forward portion 112 of the body 102 of the robotic cleaner 100.

In instances where the optical disperser 204 includes a mirror (e.g., a conical mirror), portions of the mirror may be absorptive and portions of the mirror may be reflective. In these instances, the reflected light may not extend continuously around at least a portion of the body 102 of the robotic cleaner 100. In other words, the optical pattern 108 may be discontinuous (e.g., include both illuminated and non-illuminated portions).

Figure 3:
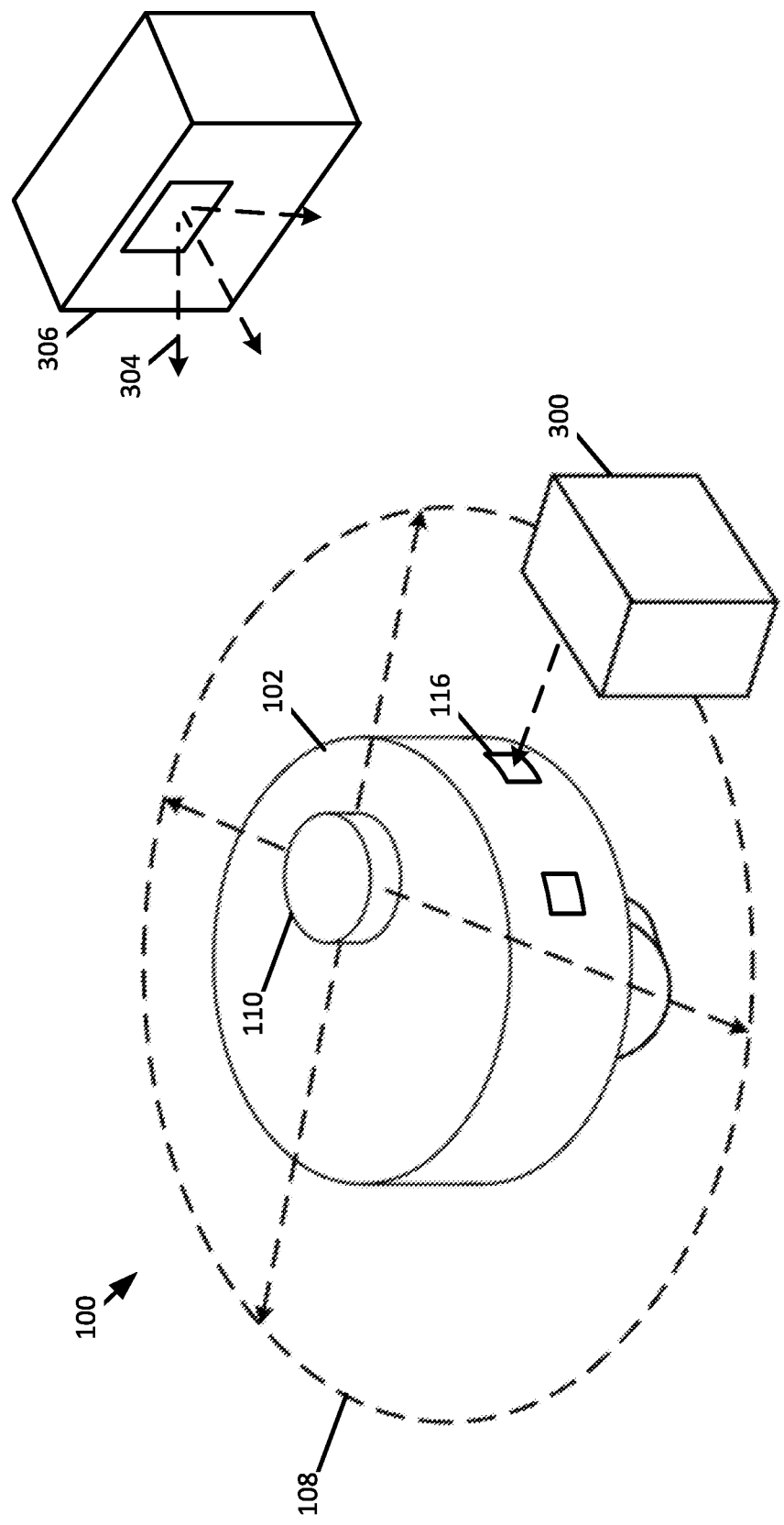
FIG. 3 is a schematic perspective view of an example of the robotic cleaner of FIG. 1 in an environment having an object and an external device, consistent with embodiments of the present disclosure.

As shown in FIG. 3, when the optical pattern 108 intersects an obstacle 300 at least a portion of the light is reflected towards the robotic cleaner 100. At least a portion of the reflected light is detected by one or more optical receivers 116. Based on the detection of the reflected light, the robotic cleaner 100 may change a movement behavior such that, for example, the robotic cleaner 100 can avoid contact with the obstacle 300.

A position of the obstacle 300 relative to the robotic cleaner 100 may be determined based on which optical receivers 116 detect the reflected light. For example, if only a left optical receiver detects the reflected light, the robotic cleaner 100 may determine that the obstacle 300 is positioned to the left of the robotic cleaner 100. In this instance, the robotic cleaner 100 may not need to change its movement behavior to avoid the obstacle 300. By way of further example, if a forward most optical receiver detects the reflected light, the robotic cleaner 100 may determine that the obstacle 300 is positioned forward of the robotic cleaner 100. In this instance, the robotic cleaner 100 may need to change its movement behavior to avoid the obstacle 300. By way of still further example, when a forward most and a right optical receiver detect the reflected light, the robotic cleaner 100 may determine that the obstacle 300 is located at a forward right position. In this instance, the robotic cleaner 100 may need to change its movement behavior to avoid the obstacle 300. While the optical receivers 116 are generally described as left, forward, and right optical receivers, the robotic cleaner 100 may have any number of optical receivers positioned at any number of locations around the periphery of the body 102 of the robotic cleaner 100. For example, the robotic cleaner 100 may have one or more optical receivers 116 located along a rearward portion of the robotic cleaner 100.

The optical receiver 116 can also be configured to detect an optical signal 304 defined by light emitted by an external device 306 (e.g., a docking station or a beacon). The robotic cleaner 100 can be configured to follow the optical signal 304 such that, for example, the robotic cleaner 100 can engage (e.g., contact) the external device 306 (e.g., to recharge one or more batteries of the robotic cleaner 100). Accordingly, the robotic cleaner 100 can be configured to differentiate between light defining the optical signal 304 and light reflected as a result of the optical pattern 108 intersecting the obstacle 300. For example, the optical emitter 202 can be configured to generate light pulses according to a first pulse rate and the optical signal 304 can be generated using light pulsed according to a second pulse rate, the first pulse rate being different from the second pulse rate. In other words, the optical pattern 108 can be generated according to the first pulse rate and the optical signal 304 can be generated according to a second pulse rate.

In some instances, the robotic cleaner 100 may include external device optical receivers configured to detect the optical signal 304 emitted by the external device 306. As such, light defining the optical signal 304 and the light emitted from the optical pattern generator 110 in the form of the optical pattern 108 may not be encoded (e.g., may not be pulsed at different pulse rates). In these instances, the optical receiver 116 may not be able to detect the light defining the optical signal 304 and/or the external optical receivers may not be able to detect light emitted from the optical pattern generator 110. For example, an intensity of the light defining the optical signal 304 may fall below a detection threshold of the optical receiver 116. By way of further example, an intensity of the light defining the optical signal 304 may fall within a first detection range that corresponds to the external device optical receivers and an intensity of the light emitted from the optical pattern generator 110 may be configured such that reflected light from the optical pattern 108 falls within a second detection range that corresponds to the optical receiver 116. By way of still further example, the light defining the optical signal 304 may correspond to a first wavelength of light (or range of wavelengths) and the light emitted from the optical pattern generator 110 may correspond to a second wavelength of light (or range of wavelengths), wherein the external device optical receivers are configured to only detect the first wavelength (or wavelength range) and the optical receiver 116 is configured to only detect the second wavelength (or wavelength range).

The optical receiver 116 can be, for example, a photodiode capable of receiving and detecting light corresponding to the light emitted by the optical emitter 202 (e.g., infrared, visible, ultraviolet, and/or any other spectrum of light). In some instances, the optical receiver 116 can be configured to detect an intensity (or time of flight) of the reflected light and based, at least in part, on the intensity (or time of flight) determine a measure of a distance to the obstacle 300.

Figure 4:
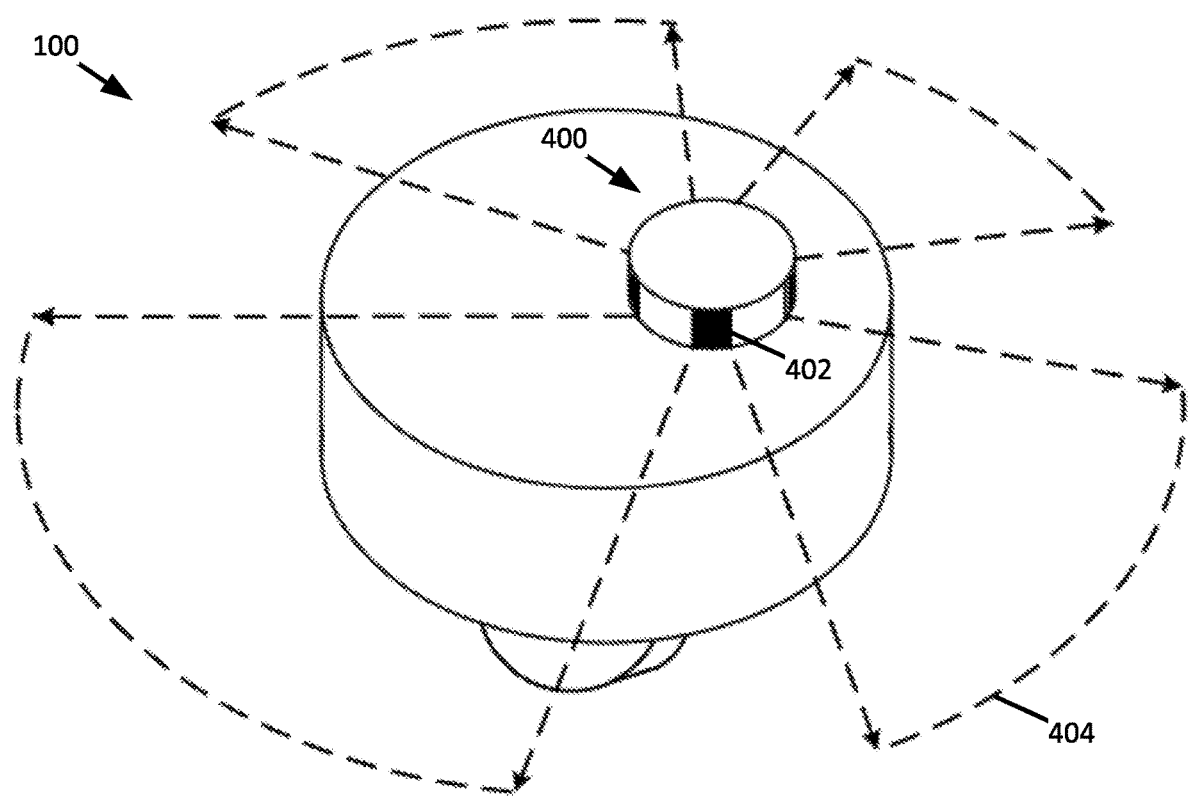
FIG. 4 is another schematic perspective view of an example of the robotic cleaner of FIG. 1, consistent with embodiments of the present disclosure.

FIG. 4 shows a schematic example of the robotic cleaner 100 having an optical pattern generator 400. The optical pattern generator 400 may be an example of the optical pattern generator 110 of FIG. 1. As shown, the optical pattern generator 400 includes one or more partitions 402. The partitions 402 can be configured to shape at least a portion of an optical pattern 404 generated by the optical pattern generator 400.

For example, the partitions 402 can be configured to block at least a portion of the light emitted from the optical pattern generator 400. Such a configuration can result in the generated optical pattern 404 being discontinuous. In other words, the optical pattern 404 can include one or more illuminated portions and one or more non-illuminated portions. In these instances, the robotic cleaner 100 may be able to determine a direction of travel and/or a location of an obstacle relative to the robotic cleaner 100 based, at least in part, on the optical pattern 404. For example, movement of the obstacle into and out of illuminated and non-illuminated regions may indicate a direction of travel of the robotic cleaner 100 and/or a location of an obstacle relative to the robotic cleaner 100.

In some instances, the partitions 402 can be configured to be adjustable to selectively block at least portion of the light incident thereon. As such, the size and/or shape of the optical pattern 404 may be adjusted. In some instances, adjusting the optical pattern 404 may allow the optical pattern 404 to convey information to an external device (e.g., a smartphone) capable of capturing an image of the optical pattern 404. The communicated information may be used, for example, to communicate a state of the robotic cleaner 100 to the external device, generate an augmented reality using the external device, and/or the like.

Figure 5:
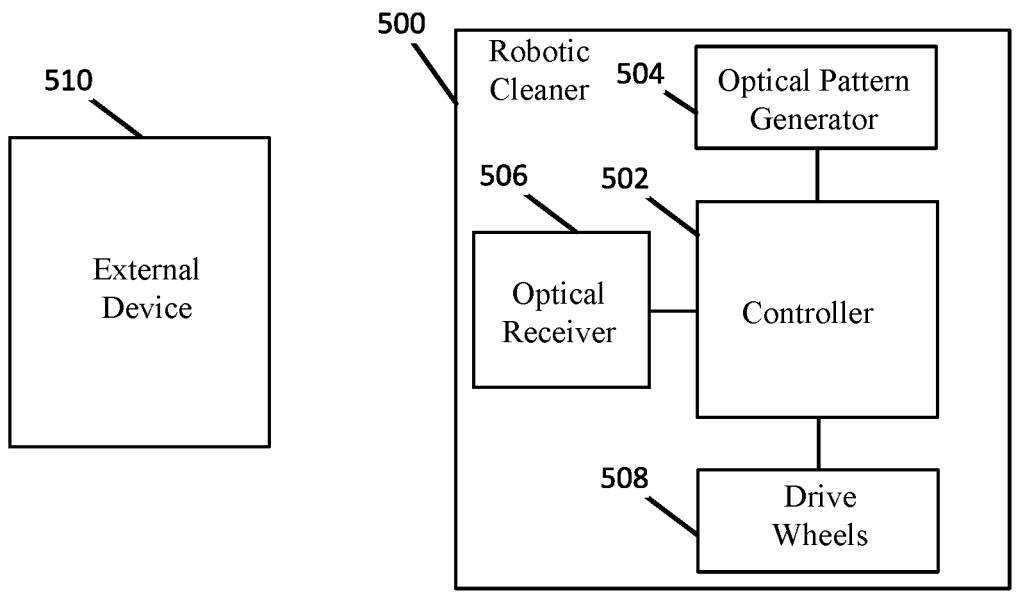
FIG. 5 shows a schematic block diagram of an example of a robotic cleaner, consistent with embodiments of the present disclosure.

FIG. 5 shows a schematic block diagram of a robotic cleaner 500, which may be an example of the robotic cleaner 100. As shown, the robotic cleaner 500 includes a controller 502 communicatively coupled to an optical pattern generator 504, an optical receiver 506, and a plurality of drive wheels 508. The controller 502 is configured to cause the optical pattern generator 504 to generate light which defines an optical pattern. The optical pattern is projected into a surrounding environment. Light defining the optical pattern may be reflected by obstacles within the surrounding environment and back towards the robotic cleaner 500, wherein at least a portion of the reflected light is incident on the optical receiver 506. In response to the optical receiver 506 detecting the reflected light, the controller 502 may cause the plurality of drive wheels 508 to rotate at different rotational speeds such that a travel direction of the robotic cleaner 500 is altered.

The optical receiver 506 is further configured to detect light that defines an optical signal generated by an external device 510. When the optical signal is detected by the optical receiver 506, the controller 502 can be configured to cause the robotic cleaner 500 to engage in a behavior associated with the detected optical signal. As such, the controller 502 can be configured to differentiate between an optical signal generated by the external device 510 and reflected light from the optical pattern. In other words, the controller 502 can be configured to determine whether the optical receiver 506 detects the optical signal or the reflected light.

Figure 6:
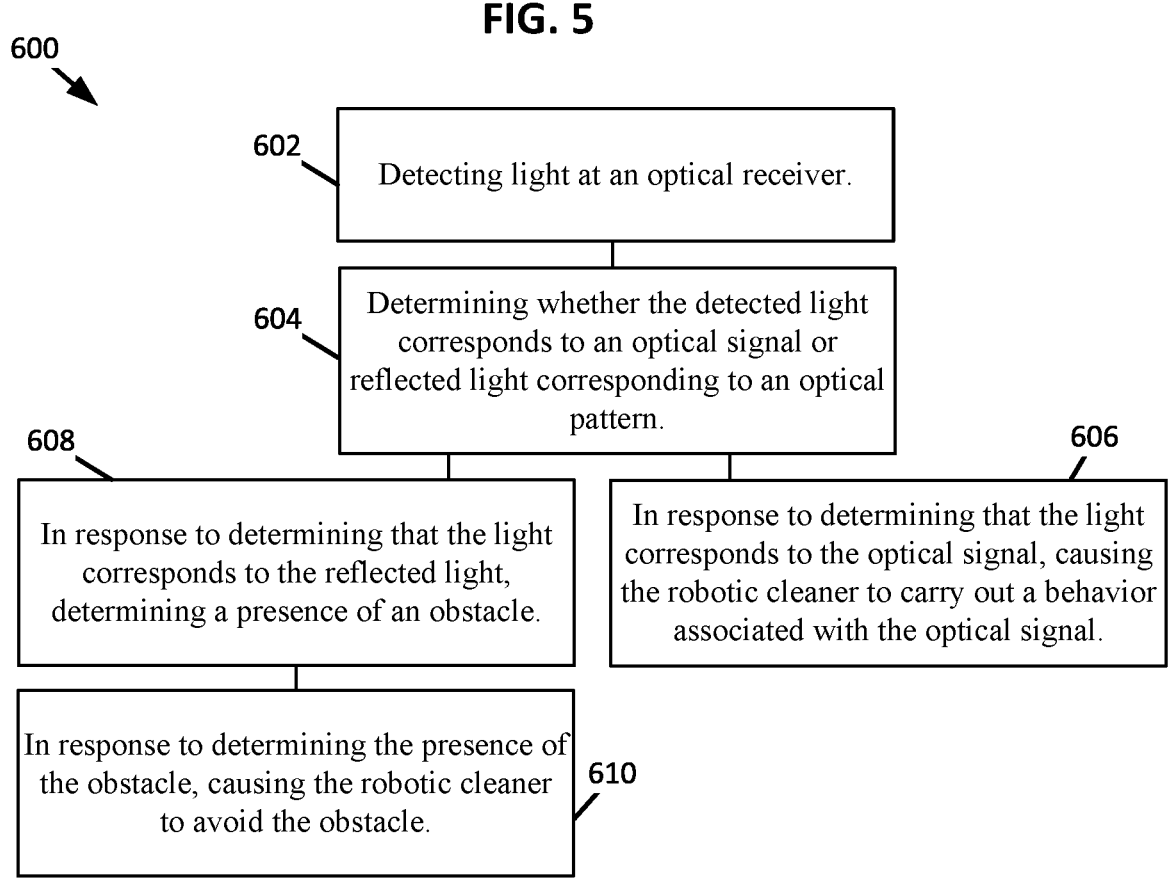
FIG. 6 shows a flow chart of an example of a method, consistent with embodiments of the present disclosure.

FIG. 6 shows a flow chart illustrating an example of a method 600 capable of being carried out by the robotic cleaner 500 of FIG. 5. One or more steps of the method 600 may be embodied in one or more of software, firmware, and/or hardware. For example, one or more steps of the method 600 may be embodied as one or more computer readable instructions stored in one or more memories of the controller 502 and that are capable of being executed by one or more processors of the controller 502.

As shown, the method 600 may include a step 602. The step 602 includes detecting light at an optical receiver, the light corresponds to an optical signal generated by an external device or reflected light from an optical pattern generated by an optical pattern generator.

The method 600 may also include a step 604. The step 604 includes determining whether the detected light corresponds to the optical signal or the reflected light.

The method 600 may also include a step 606. The step 606 is carried out in response to determining that the detected light corresponds to the optical signal and includes causing the robotic cleaner to carry out a behavior associated with the optical signal. The behavior may include, for example, causing the robotic cleaner to move towards or away from the external device, causing the robotic cleaner to alter a cleaning behavior (e.g., change a suction force), and/or any other behavior.

The method 600 may also include a step 608. The step 608 is carried out in response to determining that the detected light corresponds to the reflected light and includes determining a presence of an obstacle based, at least in part, on the reflected light. The step 608 may also include determining a location of the obstacle relative to the robotic cleaner.

The method 600 may also include a step 610. The step 610 is carried out in response to determining the presence of the obstacle and includes causing the robotic cleaner to avoid contacting the obstacle. For example, the driven wheels may be caused to operate at different speeds to cause the robotic cleaner to alter a travel direction of the robotic cleaner.

An example of a robotic cleaner, consistent with the present disclosure, may include a body, an optical receiver, the optical receiver being configured to detect an optical signal generated by an external device, and an optical pattern generator configured to emit light according to an optical pattern that extends at least partially around the body, wherein, when the optical pattern intersects an obstacle, at least a portion of the light incident on the obstacle is reflected towards the optical receiver, the optical receiver being configured to detect the reflected light.

In some instances, the optical pattern generator may include an optical emitter optically coupled to an optical disperser. In some instances, the optical disperser may be a conical mirror. In some instances, the optical emitter may be configured to generate light according to a first pulse rate and the optical signal is generated according to a second pulse rate, the first pulse rate being different from the second pulse rate. In some instances, the optical pattern generator may include one or more partitions configured to block at least a portion of light emitted from the optical pattern generator. In some instances, the optical pattern may be discontinuous. In some instances, the optical pattern generator may be disposed on a central axis of the body. In some instances, the optical pattern generator may be centrally disposed on the body.

Another example of a robotic cleaner, consistent with the present disclosure, may include a body, an optical receiver, the optical receiver being configured to detect an optical signal generated by an external device, an optical pattern generator configured to emit light according to an optical pattern that extends at least partially around the body, wherein, when the optical pattern intersects an obstacle, at least a portion of the light incident on the obstacle is reflected towards the optical receiver, the optical receiver being configured to detect the reflected light, and a controller configured to determine whether the optical receiver detects the optical signal or the reflected light.

In some instances, the optical pattern generator may include a light emitting diode optically coupled to a conical mirror. In some instances, the light emitting diode may be configured to generate light according to a first pulse rate and the optical signal is generated according to a second pulse rate, the first pulse rate being different from the second pulse rate. In some instances, the optical pattern generator may include one or more partitions configured to block at least a portion of light emitted from the optical pattern generator. In some instances, the optical pattern may be discontinuous. In some instances, the optical pattern generator may be disposed on a central axis of the body. In some instances, the optical pattern generator may be centrally disposed on the body.

An example of a robotic system, consistent with the present disclosure may include an external device configured to generate an optical signal and a robotic cleaner. The robotic cleaner may include a body, an optical receiver configured to detect the optical signal generated by the external device, and an optical pattern generator configured to generate an optical pattern, the optical pattern being defined by light that extends at least partially around the body, wherein, when the optical pattern intersects an obstacle, at least a portion of the light that is incident on the obstacle is reflected towards the optical receiver, the optical receiver being configured to detect the reflected light.

In some instances, the optical pattern generator may include a light emitting diode optically coupled to a conical mirror. In some instances, the optical pattern generator may include one or more partitions configured to block at least a portion of light emitted from the optical pattern generator. In some instances, the optical receiver may be a photodiode. In some instances, the optical pattern may be discontinuous.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A robotic cleaner comprising:
a body;
an optical receiver, the optical receiver being configured to detect an optical signal generated by an external device; and
an optical pattern generator configured to emit light according to an optical pattern that extends at least partially around the body, wherein, when the optical pattern intersects an obstacle, at least a portion of the light incident on the obstacle is reflected towards the optical receiver, the optical receiver being configured to detect the reflected light, wherein:

the optical pattern generator includes an optical emitter optically coupled to an optical disperser; and
the optical emitter is configured to generate light according to a first pulse rate and the optical signal is generated according to a second pulse rate, the first pulse rate being different from the second pulse rate.

2. The robotic cleaner of claim 1, wherein the optical disperser is a conical mirror.

3. The robotic cleaner of claim 1, wherein the optical pattern generator includes one or more partitions configured to block at least a portion of light emitted from the optical pattern generator.

4. The robotic cleaner of claim 1, wherein the optical pattern is discontinuous.

5. The robotic cleaner of claim 1, wherein the optical pattern generator is disposed on a central axis of the body.

6. The robotic cleaner of claim 5, wherein the optical pattern generator is centrally disposed on the body.

7. A robotic cleaner comprising:
a body;
an optical receiver, the optical receiver being configured to detect an optical signal generated by an external device;
an optical pattern generator configured to emit light according to an optical pattern that extends at least partially around the body, wherein, when the optical pattern intersects an obstacle, at least a portion of the light incident on the obstacle is reflected towards the optical receiver, the optical receiver being configured to detect the reflected light; and
a controller configured to determine whether the optical receiver detects the optical signal or the reflected light.

8. The robotic cleaner of claim 7, wherein the optical pattern generator includes a light emitting diode optically coupled to a conical mirror.

9. The robotic cleaner of claim 8, wherein the light emitting diode is configured to generate light according to a first pulse rate and the optical signal is generated according to a second pulse rate, the first pulse rate being different from the second pulse rate.

10. The robotic cleaner of claim 7, wherein the optical pattern generator includes one or more partitions configured to block at least a portion of light emitted from the optical pattern generator.

11. The robotic cleaner of claim 7, wherein the optical pattern is discontinuous.

12. The robotic cleaner of claim 7, wherein the optical pattern generator is disposed on a central axis of the body.

13. The robotic cleaner of claim 12, wherein the optical pattern generator is centrally disposed on the body.

14. A robotic system comprising:
an external device configured to generate an optical signal; and
a robotic cleaner, the robotic cleaner including:
a body;
an optical receiver configured to detect the optical signal generated by the external device;
an optical pattern generator configured to generate an optical pattern, the optical pattern being defined by light that extends at least partially around the body, wherein, when the optical pattern intersects an obstacle, at least a portion of the light that is incident on the obstacle is reflected towards the optical receiver, the optical receiver being configured to detect the reflected light; and a controller configured to determine whether the optical receiver detects the optical signal or the reflected light.

15. The robotic system of claim 14, wherein the optical pattern generator includes a light emitting diode optically coupled to a conical mirror.

16. The robotic system of claim 14, wherein the optical pattern generator includes one or more partitions configured to block at least a portion of light emitted from the optical pattern generator.

17. The robotic system of claim 14, wherein the optical receiver is a photodiode.

18. The robotic system of claim 14, wherein the optical pattern is discontinuous.

* * * * *